United States Patent [19]

Brixy et al.

[11] Patent Number: 4,479,026
[45] Date of Patent: Oct. 23, 1984

[54] MEASURING RESISTOR FOR A NOISE THERMOMETER

[75] Inventors: Heinz Brixy, Niederzier; Detmar von Mallinckrodt; Volker Justus, both of Aachen, all of Fed. Rep. of Germany

[73] Assignee: Kernforschungsanlage Jülich GmbH, Jülich, Fed. Rep. of Germany

[21] Appl. No.: 496,451

[22] Filed: May 20, 1983

[30] Foreign Application Priority Data

May 21, 1982 [DE] Fed. Rep. of Germany ....... 3219168

[51] Int. Cl.³ ............................................. H01L 35/02
[52] U.S. Cl. .................................. 136/232; 136/233; 136/238; 374/175; 374/185
[58] Field of Search ....................... 136/232, 233, 238; 374/175, 185

[56] References Cited

U.S. PATENT DOCUMENTS

| 3,937,086 | 2/1976 | von Thuna | 374/175 |
| 3,956,936 | 5/1976 | Brixy | 136/233 |
| 3,966,500 | 6/1976 | Brixy | 136/232 |
| 4,099,413 | 7/1978 | Ohte et al. | 374/175 |
| 4,278,828 | 7/1981 | Brixy | 136/232 |

*Primary Examiner*—Leland A. Sebastian
*Attorney, Agent, or Firm*—Karl F. Ross; Herbert Dubno

[57] ABSTRACT

A noise thermometer of the type in which a resistive sensing element is exposed to elevated temperatures and has a measuring circuit connected thereto so that the noise voltage output of the sensing element is detected. According to the invention this element is a rectangular parallelopiped, elongated or cubical, of lanthanum chromite, $LaCrO_3$.

7 Claims, 4 Drawing Figures

MEASURING RESISTOR FOR A NOISE THERMOMETER

FIELD OF THE INVENTION

The present invention relates to a noise thermometer and, more particularly, to a resistive sensing element for use in a noise thermometer.

BACKGROUND OF THE INVENTION

As will be apparent from the following commonly owned U.S. Pat. Nos. 3,811,761, 3,890,841, 3,956,936, 3,964,314, 3,966,500 and 4,278,828 (see also German patent document DE-GM No. 71 11 837 corresponding to U.S. Pat. No. 3,964,314), temperature measuring instruments having a resistive element forming a sensor are known and are widely used for a variety of purposes in high temperature applications.

Such temperature measuring instruments are known as noise thermometers and utilize the fact that temperature is associated with variations in electrical parameters. These systems, more specifically, use the noise voltage produced in a conductor or resistive element by thermal agitation of electrically charged particles therein.

The thermal noise power is proportional to the resistance value, is proportional to the absolute temperature and, of course, is proportional in the frequency band width over which the noise is measured. The thermal noise is also known as Johnson noise.

All metals have the noise generation properties mentioned above, i.e. produce a noise voltage which is proportional to temperature. For the most part, platinum has been used heretofore in temperature sensors operating under the noise voltage principle.

Temperature sensors of the type described have the advantage that the output is usually discriminated from other changes and is not falsified by variations which are not proportional to temperature.

In the aforementioned patents, the sensing element is generally a thin strand of a pure metal or a metal alloy generally with a cross section corresponding to a circular area with a diameter between 5 microns and 50 microns and usually with a thickness in this range. The metals used include pure metals such as tungsten, tantalum, molybdenum, niobium, titanium, zirconium and platinum. Alloys of chromium, nickel and iron, preferably with these metals, are also described as being effective and the patents describe ceramic supports for the comparatively thin strands.

Noise thermometers are particularly suitable for measuring temperatures above 1150° C. and thus the most advantageous group of metals and alloys are those of platinum, rhodium, tungsten and tantalum, i.e. metals which are refractory to temperatures of 1150° C. and above.

As experience with such metals has progressed, it has been found that they have relatively high temperature coefficients of electrical resistance. As a consequence, relatively large values of the measured parameter $\overline{V^2}$, i.e. the mean square noise voltage, when the measuring temperature during the process is not sufficiently constant. One must thus tolerate an imprecise measurement.

The relatively high temperature coefficient of electrical resistance of these materials also creates difficulties with respect to the matching of the measuring resistance and the conductors which are to be joined thereto. In fact, a matching of this type is possible only for a comparatively small temperature measurement range.

Because of the relatively small specific resistance of such materials even at comparatively high temperatures, they had to be fabricated heretofore with very small diameters, usually below 0.2 mm or applied as relatively thin layers to a carrier. As a consequence, it was difficult to provide the metals in resistance units of the requisite resistance value generally greater than 5 ohms, and simultaneously to make the sensor sufficiently small to permit it to be used as a point-like measuring sensor.

As the diameter of the wire was reduced, stability and mechanical strength factors entered into the design and created fabrication problems and problems with use because of mechanical sensitivity.

Furthermore, the refractory metals and their alloys can only be prepared at comparatively high cost in protective gas atmospheres or in vacuum.

It is known, from U.S. Pat. No. 2,710,899, to utilize oxide ceramics such as $Al_2O_3$, $CaO$, $ZrO_2$, $BeO$, $ThO_2$, or $MgO$ as noise thermometer resistance elements. These materials also have high temperature coefficients of resistivity so that the problems discussed above in connection with such coefficients remain. Further, they are also characterized by the aforedescribed problem of matching the measuring resistor and conductors running thereto.

Furthermore, the specific resistances of these oxide ceramics may also be too high at elevated temperatures to permit resistance elements with a resistivity of about 10 ohms to be fabricated as is preferred.

It is also a disadvantage of these oxide ceramics that they constitute ion conductors whose resistance at high temperatures may vary upon the application of a voltage, thereby creating problems in determining the measuring resistance $R_M$. There is also some question as to whether ionic conductors in the frequency range of up to 300 kHz, common for noise thermometers, have a white frequency spectrum as is necessary for the usual comparison methods.

OBJECTS OF THE INVENTION

It is the principal object of the present invention to provide a noise thermometer whereby the aforedescribed disadvantages are obviated.

Still another object of this invention is to provide an improved measuring element for a noise thermometer whereby the problems with a high temperature coefficient of resistivity, structural sensitivity and ion conductivity are eliminated.

SUMMARY OF THE INVENTION

These objects and others which will become apparent hereinafter are attained, in accordance with the present invention, in a noise thermometer wherein the sensing element is a lanthanum chromite ($LaCrO_3$), preferably in the form of a rectangular parallelopiped, e.g. a cube or an elongated structure.

We have discovered, quite surprisingly, that lanthanum chromite by contrast with the oxide ceramics mentioned previously, has an extremely small temperature coefficient of resistance at temperatures above 1000° C. For example, the temperature coefficient $\alpha$ is less than $2 \times 10^{-4}$/°K which compares with platinum in this temperature range having a temperature coefficient $\alpha$ of $1 \times 10^{-3}$/°K to $2 \times 10^{-3}$/°K.

Furthermore, the specific resistance of lanthanum chromite at temperatures above 1000° C. are most advantageous since there is no need to form thin, extremely elongated or other complex structures out of the material to have the desired resistance of about 10 ohms ±1 ohm.

As a consequence, comparatively strong or robust sensing resistors can be formed with relatively long useful life.

It is also an advantage that lanthanum chromite is not an ionic conductor as are the oxide ceramics mentioned above, but rather is at least primarily an electron conductor so that it has a white frequency spectrum in the frequency range most suitable for noise thermometry and the resistance of the element is practically independent from the applied measuring voltage.

Lanthanum chromite is, moreover, extremely stable even in oxidizing atmospheres so that a noise thermometer embodying same can be used highly effectively in petrochemical and metallurgical (e.g. iron and steel) industries.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
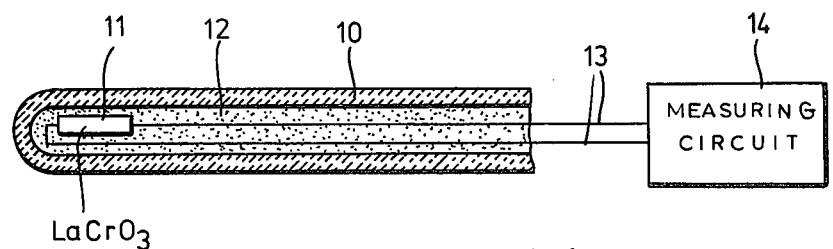
FIG. 1 is a diagrammatic cross section through a noise thermometer embodying the invention, the measuring circuit being shown in block diagram form.

A ceramic sheath 10, as described in U.S. Pat. No. 4,278,828, forms a container or housing for at least one resistive sensing element 11 in accordance with the present invention, the sensing element being held in place by an appropriate composition, e.g. a mass of particles 12 as described in this latter patent.

Two conductors 13 which are connected to the sensing element 11 are led from refractory tube 10 and run to a measuring circuit 14 which operates in the manner described in this latter patent. Other conductors as may be necessary for reference purposes or the like will also be provided as required.

Figure 2:
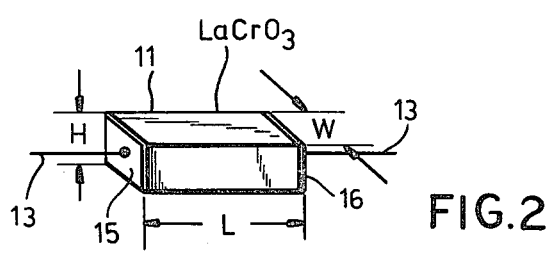
FIG. 2 is a perspective view of a resistive sensing element according to the invention.

For the purposes of the present invention, it is merely necessary to note that the body 11 is composed of a lanthanum chromite refractory material and, as shown in FIG. 2, may have the configuration of a rectangular parallelopiped provided at its opposite ends with correct or other conductive films 15 and 16 which are connected, in turn, to the conductors 13.

By way of a specific example, a noise thermometer having the configuration shown in FIG. 1 and utilizing the lanthanum chromite sensor of FIG. 2 with a height H of 2 mm, a width W of 2 mm and a length of 5 mm was found to have an electrical resistance of 9.5 ohmns at 1500° C. and was highly effective and stable while being mechanically resistant to shock.

Figure 3:
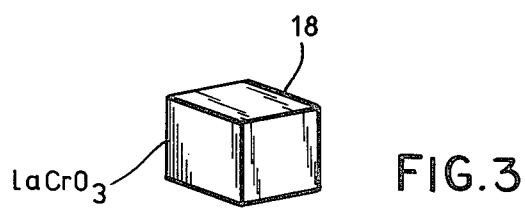
FIG. 3 is another perspective view of a sensing element according to this invention.
Figure 4:
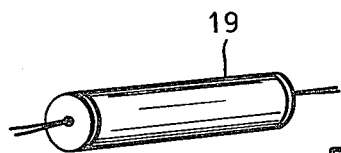
FIG. 4 is still another perspective view of a sensing element according to the invention.

As shown in FIG. 3, the lanthanum chromite body could also be a cube 18 or a cylinder 19 as shown in FIG. 4 of corresponding resistance.

We claim:

1. In a noise thermometer wherein a resistive sensing element is exposed to an elevated temperature and the noise voltage output thereof is detected by a measuring circuit, the improvement wherein said element consists of lanthanum chromite.

2. The noise thermometer defined in claim 1 wherein said element has the configuration of a rectangular parallelopiped.

3. The noise thermometer defined in claim 2 wherein said element is elongated.

4. The noise thermometer defined in claim 2 wherein said element is a cube.

5. The noise thermometer defined in claim 2 wherein said element has dimensions such that the resistance of said element is substantially 10 ohms ±1 ohm.

6. The noise thermometer defined in claim 2 wherein said element has a temperature coefficient of resistivity at 1500° C. of less than $2 \times 10^{-4}/°K$.

7. The noise thermometer defined in claim 2 wherein said element is a cylinder.

* * * * *